(12) United States Patent
Wei et al.

(10) Patent No.: US 7,418,064 B2
(45) Date of Patent: Aug. 26, 2008

(54) SYSTEMS AND METHODS FOR HIERARCHICALLY DEMODULATING AND DECODING A DATA SIGNAL USING A PILOT SIGNAL AND AN ADDITIONAL SIGNAL

(75) Inventors: Yongbin Wei, San Diego, CA (US); Durga P. Malladi, San Diego, CA (US); Stein Lundby, Solana Beach, CA (US); Tao Chen, La Jolla, CA (US); Serge Willenegger, Onnens (CH)

(73) Assignee: QUALCOMM, Incorporated, San Diego, CA (US)

( * ) Notice: Subject to any disclaimer, the term of this patent is extended or adjusted under 35 U.S.C. 154(b) by 722 days.

(21) Appl. No.: 10/781,461

(22) Filed: Feb. 17, 2004

(65) Prior Publication Data

US 2005/0002444 A1 Jan. 6, 2005

Related U.S. Application Data

(60) Provisional application No. 60/470,770, filed on May 14, 2003, provisional application No. 60/452,790, filed on Mar. 6, 2003, provisional application No. 60/448,269, filed on Feb. 18, 2003.

(51) Int. Cl.
*H04L 27/06* (2006.01)
*H04B 1/707* (2006.01)

(52) U.S. Cl. .................. 375/340; 375/147; 375/316

(58) Field of Classification Search ................. 375/147, 375/316, 340; 370/320, 335, 342, 441, 479; 455/561
See application file for complete search history.

(56) References Cited

U.S. PATENT DOCUMENTS

| 5,544,156 A   | * | 8/1996 | Teder et al.    | 370/342 |
| 6,414,988 B1  | * | 7/2002 | Ling            | 375/147 |
| 2002/0021683 A1 | * | 2/2002 | Holtzman et al. | 370/335 |

* cited by examiner

*Primary Examiner*—Betsy L Deppe
(74) *Attorney, Agent, or Firm*—Hossaine Beladi; Larry J. Moskowitz; Thomas Rouse

(57) ABSTRACT

Systems and methods for demodulating and decoding signals on a multi-path data channel using a pilot signal and at least one additional signal as a demodulation reference. One embodiment includes a method in which a pilot signal is used to demodulate and decode an additional signal, and then both the pilot signal and the additional signal are used to demodulate and decode a data traffic signal. A receiver receives a data traffic signal, a rate indicator signal and a pilot signal. The pilot signal is used as a demodulation reference for the rate indicator signal. After the rate indicator signal is demodulated and decoded, this signal is re-encoded and compared to the received rate indicator signal and used in combination with the pilot signal as a demodulation reference for the demodulation and decoding of the data traffic signal and to estimate SNR for power control purposes.

37 Claims, 6 Drawing Sheets

SYSTEMS AND METHODS FOR HIERARCHICALLY DEMODULATING AND DECODING A DATA SIGNAL USING A PILOT SIGNAL AND AN ADDITIONAL SIGNAL

CLAIM OF PRIORITY UNDER 35 U.S.C. §119

The present application is a non-provisional application claiming priority to provisional application Ser. No. 60/448,269, entitled "REVERSE LINK DATA COMMUNICATION", filed on Feb. 18, 2003; U.S. provisional application Ser. No. 60/452,790, entitled "METHOD AND APPARATUS FOR A REVERSE LINK COMMUNICATION IN A COMMUNICATION SYSTEM", filed on Mar. 6, 2003; and U.S. provisional application Ser. No. 60/470,770, entitled "OUTER-LOOP POWER CONTROL FOR REL. D", filed on May 14, 2003.

BACKGROUND

1. Field

The present invention relates generally to the field of telecommunications, and more particularly to mechanisms for demodulating and decoding data transmitted over a link in a wireless communication system, where the link has multiple channels with varying characteristics.

2. Background

Wireless communication technologies are rapidly advancing, and wireless communication systems are utilized to provide a larger and larger portion of the communications capacity that is currently available to users. This is true despite the additional technological impediments that are faced in implementing a wireless communication system, as compared to a wireline system. For instance, personal telephone communications increasingly employ cellular telephones. Further, with advancements in cellular telephone, or more accurately, wireless communication systems, additional capabilities such as mobile internet access or high-speed data communications are becoming available to users.

One type of wireless communication system comprises a cellular cdma2000 (code division multiple access) system which is configured to support voice and data communications. This system may have multiple base stations which communicate via wireless channels with multiple mobile stations. Each base station/mobile station pair is communicates via a wireless link that may include multiple channels. These channels may be dedicated to various different types of data, such as voice data, high-speed data, control data, and so on.

Typically, a wireless link utilizes both a data traffic channel and a pilot channel to enable communications between a mobile station and a base station. The data traffic channel (or simply "traffic channel") carries a signal which embodies the data that needs to be communicated between the mobile station and the base station. The pilot channel is a known signal that is used as an amplitude and phase reference for demodulating the data on the traffic channel. The pilot may therefore be referred to herein as a demodulation reference.

The power required to receive a data channel with a given quality is a function of the data rate, the signal to noise ratio (SNR) of the data channel, and the quality of the demodulation reference. For a given data rate, a larger SNR on the data channel will improve the quality of reception of the data. Similarly, for a given data rate, a larger SNR on the pilot channel will improve the accuracy of the demodulation reference, and thereby improve the quality of reception of the data.

The above is true for data being transmitted at a given data rate. It should be noted that, as the data rate increases, it is necessary to improve the quality of the modulation reference just to maintain the quality of the data demodulation. Thus, the SNR of the demodulation reference can be lower for lower data rates, but must be increased at higher data rates. For example, if a system increases its data rate from 9600 to 76,800 bps, the power of the pilot signal must be increased by 9 dB (thereby increasing its SNR by 9 dB) in order to maintain the quality of the data demodulation.

While the quality of the demodulation of the data signal can be improved by increasing the power of the demodulation reference, this should be balanced with a desire to conserve power and to minimize interference with other communications. The capacity of wireless systems is typically maximized by minimizing the amount of energy required to receive one bit of data with the desired quality. A low energy per bit allows a transmitter with a limited power to send bits at a faster rate, thereby achieving a higher data rate. In addition, a lower energy per bit will allow the transmitter to radiate less energy per bit, thereby reducing the power consumption and the interference to other devices.

The need for a demodulation reference to extract the data from a received signal raises additional issues. One such issue relates to the use of multiple traffic channels. If it is desired to have multiple traffic channels, it is likely that a single demodulation reference cannot maintain a power level that will always be optimal for each of these channels. In particular, this is true if one of the traffic channels carries relatively low-speed data, while another carries high-speed data. Demodulation of the low-speed data requires a lower-power demodulation reference, while demodulation of the high-speed data requires a higher-power demodulation reference.

SUMMARY

This need to provide a demodulation reference for traffic channels having different data rates can be addressed by having a first channel that serves as a demodulation reference for a second, low-data-rate channel, and then using the low-data-rate channel as a demodulation reference for a third, higher-data-rate channel. The second low-data-rate channel can also be used for SNR estimation for inner loop power control.

One embodiment comprises a method in which a pilot signal is used to demodulate and decode an additional signal, and then both the pilot signal and the additional signal are used to demodulate and decode a data traffic signal. The pilot and additional signal can be used to compute an SNR estimate for inner-loop power control. In this embodiment, a transmitter transmits signals on three channels to a receiver. The channels comprise a data traffic channel, a rate indicator channel and a pilot channel. The data traffic channel transmits a signal comprising frames of data traffic. The data rate at which these frames are transmitted is variable. The rate indicator channel transmits a signal comprising rate indicator frames that correspond to the data traffic frames. Each rate indicator frames identifies the data rate of the corresponding data traffic frame. The rate indicator signal has a fixed, low data rate. The pilot channel transmits a pilot signal comprising signals known to both transmitter and receiver. The pilot signal has a fixed, low data rate.

In this embodiment, the receiver receives the data traffic, rate indicator and pilot signals concurrently. Because the data transmitted in the pilot signal is known, the receiver can compare the known data stream to that received pilot signal and, based upon this comparison, determine the phase and amplitude corrections necessary to demodulate a concurrently transmitted signal. That is, the pilot signal can be used as a demodulation reference. In particular, the pilot signal is used as a demodulation reference for the rate indicator signal. When the rate indicator signal is demodulated and decoded, the actual rate indicator data contained in the signal is known, so this signal can be compared to the received rate indicator signal and used as an additional demodulation reference. More particularly, in this embodiment, the combination of the pilot signal and data rate indicator signal is used as a demodulation reference for the demodulation and decoding of the data traffic signal. Because the pilot signal and rate indicator signal in combination have more power than the pilot signal alone, this combination of signals provides greater accuracy as a demodulation reference and therefore enables the demodulation and decoding of the higher-rate data traffic signal. Since the combination of pilot and rate indicator signals have higher power, the SNR estimate for inner-loop power control is also more accurate than if the estimation was done based upon the pilot signal only.

The method of this embodiment thereby provides a means to hierarchically demodulate and decode a series of channels that have progressively higher data rates and therefore require progressively more power in the corresponding demodulation reference. The pilot signal is known and is therefore used to demodulate and decode the low-data-rate rate indicator signal. Then, once the rate indicator signal is known, it can be used as an additional source of energy for the demodulation reference to be used to demodulate and decode the higher-data-rate data traffic signal.

An alternative embodiment comprises a method including the steps of receiving a pilot signal, a first data signal and a second data signal, demodulating the first data signal using the pilot signal as a demodulation reference and demodulating at least a portion of the second data signal using the first data signal as a demodulation reference. In one embodiment, an entire frame of the signals is buffered before the first and second data signals are demodulated. In another embodiment, the signals are buffered, but demodulation and decoding of the first data signal is attempted before the entire frame is buffered. After the first data signal is successfully demodulated, it can be used as a demodulation reference for the buffered portion and the subsequently received portion of the second data signal. In another embodiment, the signals are not buffered. Demodulation and decoding of the first data signal is attempted and, after the first data signal is successfully demodulated, it can be used as an additional demodulation reference for the subsequently received portion of the second data signal. In yet another embodiment, the signals are processed in parallel. In one processing path, the second data signal is demodulated and decoded using the pilot signal as a demodulation reference. In the other processing path, the second data signal is demodulated and decoded using the pilot signal and the first data signal in combination as a demodulation reference.

Demodulation and decoding of the first data signal is attempted and, after the first data signal is successfully demodulated, the combined signal of the pilot and the first data signal can be used to estimate the received SNR for power control purposes. Because the pilot signal and rate indicator signal in combination have more power than the pilot signal alone, this combination of signals provides greater accuracy to estimate the SNR for power control purposes.

Another alternative embodiment comprises a receiver for a multi-path communication link having a receiver subsystem and a processing subsystem. The receiver subsystem is configured to receive a pilot signal, a first data signal and a second data signal. The processing subsystem is configured to demodulate the first data signal using the pilot signal as a demodulation reference and demodulate at least a portion of the second data signal using the first data signal as a demodulation reference. The demodulation and decoding of the signals may be performed in various ways, as described in the foregoing method embodiments.

Numerous additional embodiments are also possible.

DETAILED DESCRIPTION

Figure 1:
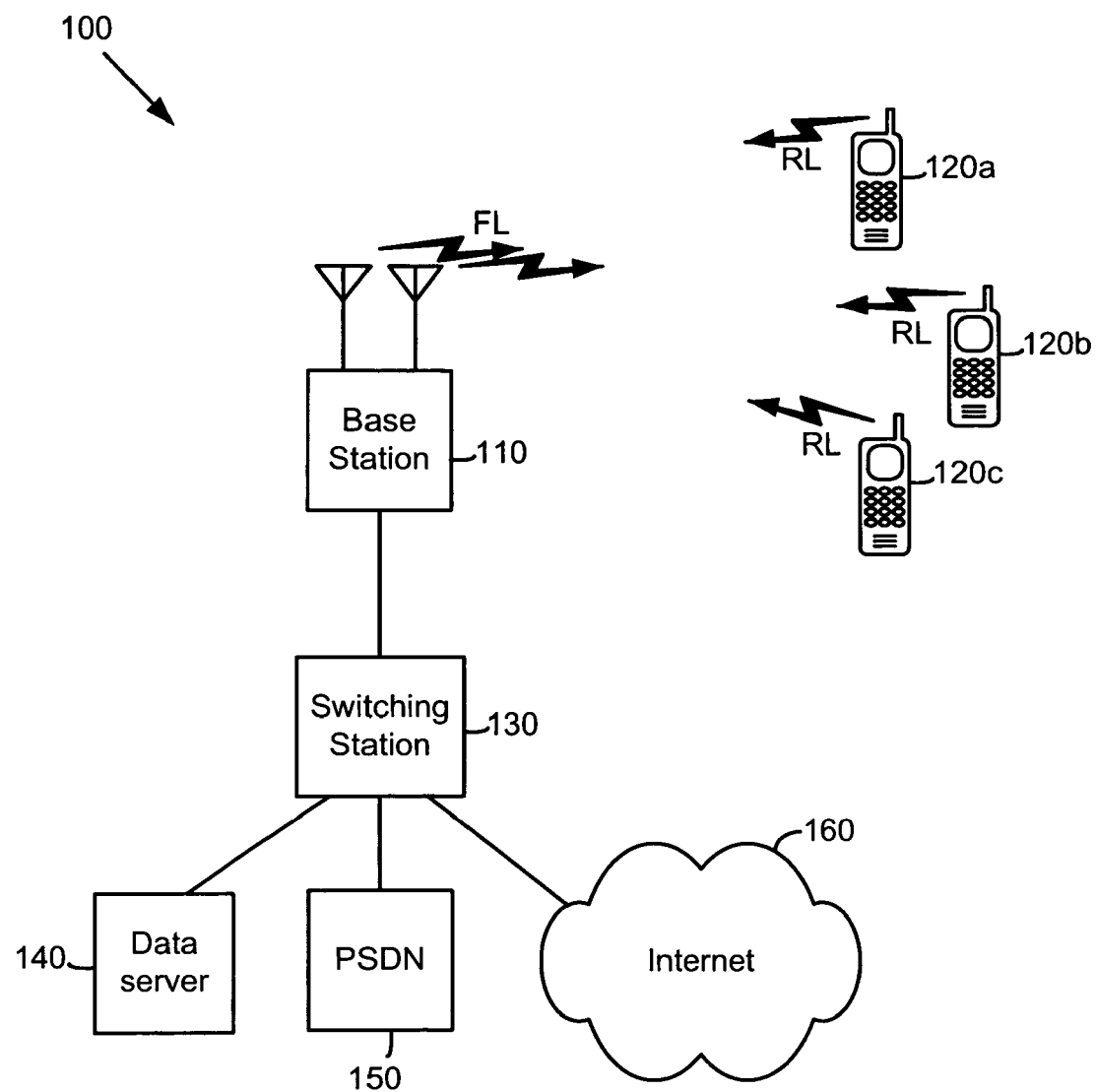
FIG. 1 is a diagram illustrating the structure of an exemplary wireless communications system in accordance with one embodiment.

One or more embodiments of the invention are described below. It should be noted that these and any other embodiments described below are exemplary and are intended to be illustrative of the invention rather than limiting.

As described herein, various embodiments of the invention comprise systems and methods for demodulating and decoding signals using a pilot signal and at least one additional signal as a demodulation reference.

One embodiment comprises a method in which a pilot signal is used to demodulate and decode an additional signal, and then both the pilot signal and the additional signal are used to demodulate and decode a data traffic signal. In this embodiment, a transmitter transmits signals on three channels to a receiver. The channels comprise a data traffic channel, a rate indicator channel and a pilot channel. The data traffic channel transmits a signal comprising frames of data traffic. The data rate at which these frames are transmitted is variable. The rate indicator channel transmits a signal comprising rate indicator frames that correspond to the data traffic frames. Each rate indicator frames identifies the data rate of the corresponding data traffic frame. The rate indicator signal has a fixed, low data rate. The pilot channel transmits a pilot signal comprising known signals. The pilot signal has a fixed, low data rate.

In this embodiment, the receiver receives the data traffic, rate indicator and pilot signals concurrently. Because the data transmitted in the pilot signal is known, the receiver can compare the known data stream to that received pilot signal and, based upon this comparison, determine the phase and amplitude corrections necessary to demodulate a concurrently transmitted signal. That is, the pilot signal can be used as a demodulation reference. In particular, the pilot signal is used as a demodulation reference for the rate indicator signal. When the rate indicator signal is demodulated and decoded, the actual rate indicator data contained in the signal is known, so this signal can be compared to the received rate indicator signal and used as an additional demodulation reference. More particularly, in this embodiment, the combination of the pilot signal and data rate indicator signal is used as a demodulation reference for the demodulation and decoding of the data traffic signal. Because the pilot signal and rate indicator signal in combination have more power than the pilot signal alone, this combination of signals provides greater accuracy as a demodulation reference and therefore enables the demodulation and decoding of the higher-rate data traffic signal.

The method of this embodiment thereby provides a means to hierarchically demodulate and decode a series of channels that have progressively higher data rates and therefore require progressively more power in the corresponding demodulation reference. The pilot signal is known and is therefore used to demodulate and decode the low-data-rate rate indicator signal. Then, once the rate indicator signal is known, it can be used as an additional source of energy for the demodulation reference to be used to demodulate and decode the higher-data-rate data traffic signal.

It should be noted that many alternative embodiments are also possible. For example, rather than a method, one alternative embodiment may comprise a receiver which is configured to receive the data traffic, rate indicator and pilot signals and process these signals as described above to demodulate and decode the received data traffic. Still another alternative embodiment may comprise a method (or system) as described above, but where a different set of signals is received. For example, it is not necessary that a rate indicator channel be used for the purpose of supplementing the pilot signal as a demodulation reference. It should also be noted that the methods and systems described herein are not limited to using three signals, but may be implemented with four or more signals. Still other variations and alternative embodiments will be apparent to those of skill in the art upon reading this disclosure.

A preferred embodiment of the invention is implemented in a wireless communication system that conforms generally to a release of the cdma2000 specification. cdma2000 is a 3rd Generation (3G) wireless communication standard that is based on the IS-95 standard. The cdma2000 standard has evolved and continues to evolve to continually support new services in a standard 1.25 MHz carrier. The preferred embodiment of the invention is intended to be operable in systems utilizing Release D of the cdma2000 standard, but other embodiments may be implemented in other Releases of cdma2000 or in systems that conform to other standards (e.g., W-CDMA). The embodiments described herein should therefore be considered exemplary, rather than limiting.

Referring to FIG. 1, a diagram illustrating the structure of an exemplary wireless communications system is shown. As depicted in this figure, system 100 comprises a base station 110 that is configured to communicate with a plurality of mobile stations 120. Mobile stations 120 may, for example, be cellular telephones, personal information managers (PIMs or PDA), or the like that are configured for wireless communication. It should be noted that these devices need not actually be "mobile," but may simply communicate with base station 110 via a wireless link. Base station 110 transmits data to mobile stations 120 via corresponding forward link (FL) channels, while mobile stations 120 transmit data to base station 110 via corresponding reverse link (RL) channels.

It should be noted that, for the purposes of this disclosure, identical items in the figures may be indicated by identical reference numerals followed by a lowercase letter, e.g., 120a, 120b, and so on. The items may be collectively referred to herein simply by the reference numeral.

Base station 110 is also coupled to a switching station 130, for example, via a wireline link. The connection to switching station 130 allows base station 110 to communicate with various other system components. These system components may include other base stations, data server 140, public switched telephone network 150, the Internet 160, and the like. It should be noted that the system components utilized in the system of FIG. 1 and described above are exemplary and other systems may comprise other types and other combinations of devices.

While, in practice, the specific designs of base station 110 and mobile stations 120 may vary significantly, each serves as a wireless transceiver for communicating over the forward and reverse links. Base station 110 and mobile stations 120 therefore have the same general structure. This structure is illustrated in FIG. 2.

Figure 2:
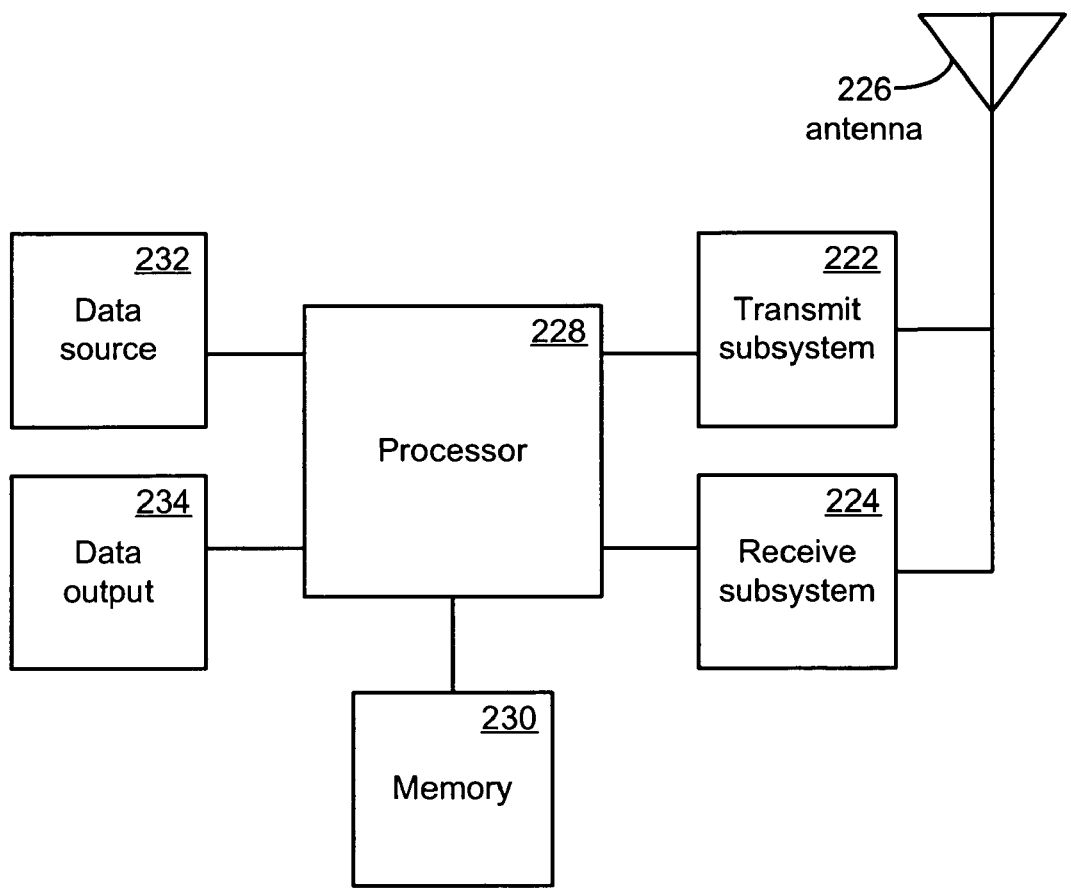
FIG. 2 is a functional block diagram illustrating the basic structural components of a wireless transceiver system in accordance with one embodiment.

Referring to FIG. 2, a functional block diagram illustrating the basic structural components of a wireless transceiver system in accordance with one embodiment is shown. As depicted in this figure, the system comprises a transmit subsystem 222 and a receive subsystem 224, each of which is coupled to an antenna 226. Transmit subsystem 222 and receive subsystem 224 may be collectively referred to as a transceiver subsystem. Transmit subsystem 222 and receive subsystem 224 access the forward and reverse links through antenna 226. Transmit subsystem 222 and receive subsystem 224 are also coupled to processor 228, which is configured to control transmit and receive subsystems 222 and 224. Memory 230 is coupled to processor 228 to provide working space and local storage for the processor. A data source 232 is coupled to processor 228 to provide data for transmission by the system. Data source 232 may, for example, comprise a microphone or an input from a network device. The data is processed by processor 228 and then forwarded to transmit subsystem 222, which transmits the data via antenna 226. Data received by receive subsystem 224 through antenna 226 is forwarded to processor 228 for processing and then to data output 234 for presentation to a user. Data output 234 may comprise such devices as a speaker, a visual display, or an output to a network device.

Persons of skill in the art of the invention will appreciate that the structure depicted in FIG. 2 is illustrative and that other embodiments may use alternative configurations. For example, processor 350, which may be a general-purpose microprocessor, a digital signal processor (DSP) or a special-purpose processor, may perform some or all of the functions of other components of the transceiver, or any other processing required by the transceiver. The scope of the claims appended hereto are therefore not limited to the particular configurations described herein.

Considering the structure of FIG. 2 as implemented in a mobile station, the components of the system can be viewed as a transceiver subsystem coupled to a processing subsystem, where the transceiver subsystem is responsible for receiving and transmitting data over wireless channel and the processing subsystem is responsible for preparing and providing data to the transceiver subsystem for transmission and receiving and processing data that it gets from the transceiver subsystem. The transceiver subsystem could be considered to include transmit subsystem 222, receive subsystem 224 and antenna 226. The processing subsystem could be considered to include processor 228, memory 230, data source 232 and data output 234.

In a CDMA system transmitters may transmit several channels that are separated through the use of different spreading codes. This may be referred to as CDM or CDMA (code division multiple access). Channel separation is obtained by applying different spreading sequences to the data corresponding to different channels. In one embodiment, the spreading codes comprise Walsh codes, and the system is referred to as a W-CDMA system. In other embodiments, other types of spreading codes may be used. The pilot and traffic channel may be handled as separate channels that are covered with separate spreading codes, the pilot channel may, in some embodiments, be inserted onto the same Walsh code as the traffic channel.

Figure 3:
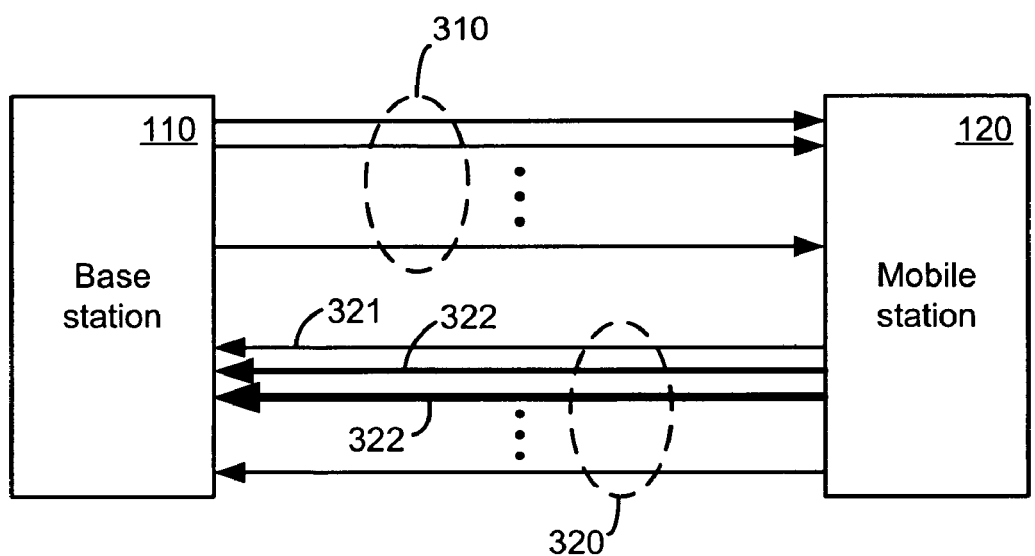
FIG. 3 is a diagram illustrating multiple channels between the mobile station and base station in accordance with one embodiment.

Referring to FIG. 3, a diagram illustrating multiple channels between the mobile station and base station is shown. As depicted in the figure, Base station 110 transmits data to mobile station 120 via a set of forward link channels 310. These channels typically include both traffic channels, over which data is transmitted, and control channels, over which control signals are transmitted. Each of the traffic channels generally has one or more control channels associated with it. Forward link channels 310 may include, for example, a Forward Fundamental Channel (F-FCH) that may be used to transmit low-speed data, a Forward Supplemental Channel (F-SCH) that may be used for high-speed, point-to-point communications, or a Forward High-Speed Broadcast Channel (F-HSBCH) that may be used to broadcast messages to multiple receivers. The channels may also include a Forward Dedicated Control Channel (F-DCCH), a forward broadcast control channel (F-BCCH) or a Forward Paging Channel (F-PCH) that may be used to transmit control information relating to the traffic channels or to other aspects of the operation of the system.

Mobile station 120 transmits data to base station 110 via a set of reverse link channels 320. Again, these channels typically include both traffic channels and control channels. Mobile station 120 may transmit data back to the base station over such channels as a reverse access channel (R-ACH), an extended reverse access channel (R-EACH), a reverse request channel (R-REQCH), a reverse enhanced supplemental channel (R-ESCH), a reverse dedicated control channel (R-DCCH), a reverse common control channel (R-CCCH), or a reverse rate indicator channel (R-RICH).

Three channels that of are particular interest here are the pilot channel 321, the reverse enhanced supplemental channel (R-ESCH) 323 and the reverse rate indicator channel (R-RICH) 322. Pilot channel 321 carries a pilot signal that is used as a demodulation reference. The pilot signal is a known signal. In one embodiment, the pilot signal is simply a series of zeros. R-ESCH 323 carries a signal that embodies the data traffic that needs to be communicated from the mobile station to the base station. R-RICH 322 is a control channel that is used to transmit control information related to the corresponding transmission on R-ESCH 323.

In communications between mobile station and base station, information is represented by bits. Several bits are grouped together into a frame and encoded into modulation symbols. The modulation symbols are then transmitted over the appropriate channels. For example, rate indicator bits are encoded into rate indicator modulation symbols and are then transmitted over R-RICH. Similarly, bits of data traffic are encoded into data modulation symbols, and transmitted over R-ESCH.

In a wireline channel, there is a single path which the corresponding signal must traverse to reach its receiver. The receiver therefore receives a single copy of the signal. In a wireless channel, however, there are typically many paths that the signal can traverse to reach the receiver. The wireless medium (the space through which the wireless signals propagate) is therefore referred to as a multi-path propagation medium. Multi-path propagation media such as wireless channels therefore cause multiple copies of a transmitted signal to reach the receiver with different time delays. Each copy may be referred to as being a multi-path.

Because of the variations in the multi-paths between the mobile station and the base station, there may be variations in the phases and amplitudes of the corresponding signals received via each of the multi-paths. The pilot signal provides a demodulation reference that, as a known signal, can be used to determine the respective phase and amplitude variations of the multi-paths. The received data signals can then be corrected using the phase and amplitude corrections that are determined based on the pilot signal.

While the simple correction of the phases and amplitudes of the different multi-paths is widely known and used in traffic channels that operate at a single data rate, channels that do not operate at a single rate (such as the R-ESCH) can complicate this situation. This is, at least in part, a result of the power control mechanism that is employed by the system. This is explained in more detail below.

Communication links in wireless communication systems are typically power controlled to compensate for variations in the received signals due to variations in the transmission medium. This power control process is traditionally based on measurement of the SNR of the pilot channel. For example, in the reverse link of one system, the base station is the receiver and the mobile station is the transmitter. The base station periodically measures the SNR of the pilot channel received from the mobile station and compares it to a target SNR. If the measured SNR is below the target SNR, the base station transmits to the mobile station an "UP" command. This directs the mobile station to increase the power level of the pilot channel, as well as the other channels. If the measured SNR is above the target SNR, the base station sends a "DOWN" command to the mobile station. This directs the mobile station to decrease the power level of the channels. The mobile station increases or decreases the transmit power of the channels by a fixed upward or downward step.

The base station in this system is always aware of whether the mobile station has increased or decreased its pilot power to support demodulation of higher or lower data rates. The base station can therefore compensate for these changes in the power control mechanism. For example, if a base station is targeting a nominal pilot SNR of 3 dB and is aware that the mobile station is transmitting at a data rate that requires a pilot SNR 5 dB higher than the nominal, the base station will increase the target SNR to 8 dB. The base station thereby compensates for variations of the propagation medium by measuring the pilot SNR, while still allowing the mobile station to increase the pilot SNR when transmitting at higher data rates on the data channel.

It is typically desirable for the transmitter to autonomously change the data rate on the data channel without prior signaling it to the receiver. Since the pilot is used as demodulation reference, it is desirable for the transmitter to also be able to autonomously change the power of the pilot channel to support demodulation of the data transmitted at the new rate in order to minimize the total transmit power.

One problem with this is that, without prior signaling, a power control process based on the SNR of the pilot cannot distinguish between a change in the pilot SNR due to a change in data rate, and a change in the pilot SNR due to a change in the transmission medium. For example, if the data channel is carrying a higher data rate, the transmitter should increase the power of the pilot channel, which is used as a demodulation reference. The power control processor at the receiver, however, does not know that the transmitter increased its pilot power because of the higher data rate. The receiver would therefore measure a pilot SNR that is above the target SNR and would immediately send commands to make the transmitter reduce the power of all channels.

The changing of the pilot power to remain optimum for each data rate therefore interferes with the power control process. The present systems and methods allow the transmitter to autonomously modify the quality of the demodulation reference, without interfering with a power control processor that is based on the pilot SNR. This is accomplished by providing a mechanism that allows the system to improve the quality of the phase and amplitude reference, without modifying the required SNR of the pilot. Since the combination of pilot and rate indicator signals have higher power, the SNR estimate for inner-loop power control is also more accurate than if the estimation was done based upon the pilot signal only.

The present systems and methods make use of the idea that the pilot power should not be changed to modify the quality of the demodulation reference—instead, an additional channel such as the rate indication channel should be used in addition to the pilot channel as a demodulation reference for higher data rates. The power of the additional channel can then be increased if necessary to support demodulation of higher data rates on the data channel. Conversely, the power of the additional channel can be reduced for lower data rates. It should be noted that, when the rate indicator channel is used, if the data traffic channel is at the lowest data rates, the power of the rate indicator channel should still be maintained at a level that is sufficiently high to be able to accurately decode the rate indicator frames.

Thus, in one embodiment, a transmitter transmits signals on three channels to a receiver. The channels comprise a data traffic channel, a rate indicator channel and a pilot channel. The data traffic channel transmits a signal comprising frames of data traffic. The data rate at which these frames are transmitted is variable. The rate indicator channel transmits a signal comprising rate indicator frames that correspond to the data traffic frames. Each rate indicator frames identifies the control information, including the data rate, of the corresponding data traffic frame. The rate indicator signal has a fixed, low data rate. The pilot channel transmits a pilot signal comprising all zeros. The pilot signal has a fixed, low data rate.

Figure 4:
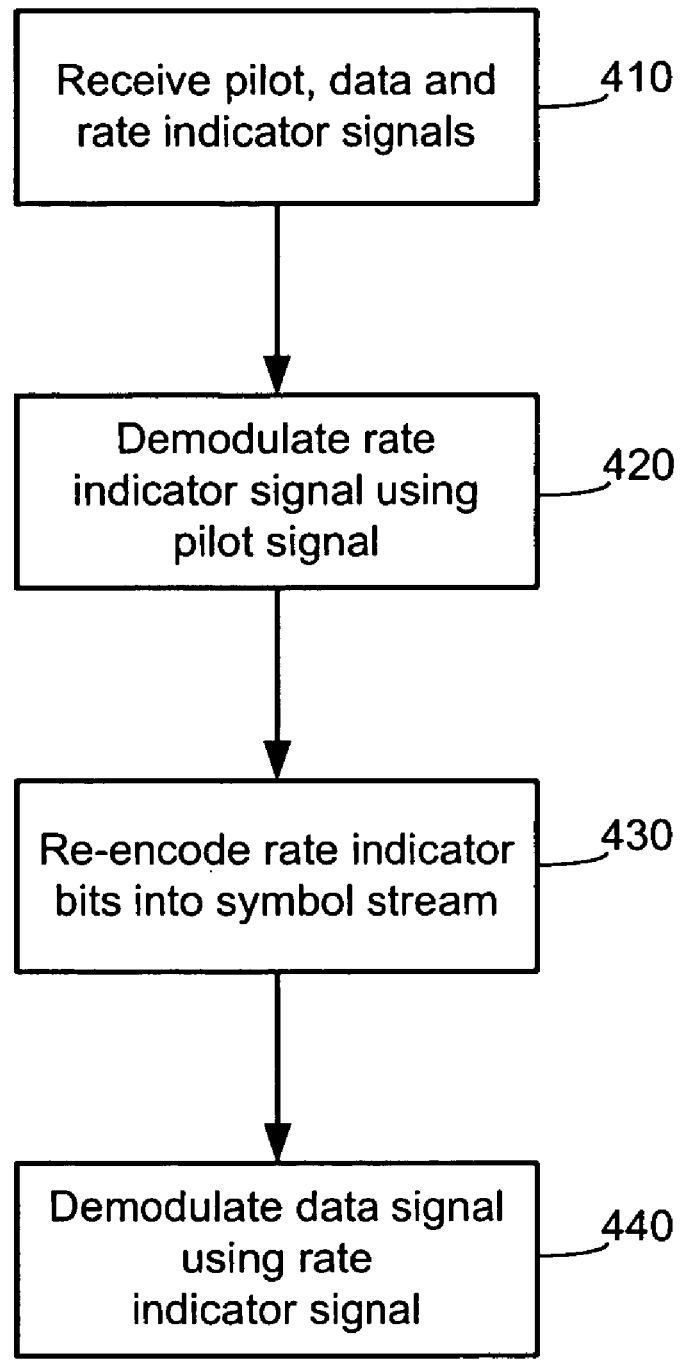
FIG. 4 is a flow diagram illustrating a method of hierarchically demodulating the rate indicator and data traffic signals in accordance with one embodiment.

Referring to FIG. 4, a flow diagram illustrating the method of hierarchically demodulating the rate indicator and data traffic signals in accordance with this embodiment is shown. In this embodiment, the receiver receives the data traffic, rate indicator and pilot signals concurrently (block 410). Because the data transmitted in the pilot signal is known, the receiver can compare the known data stream to that received pilot signal and, based upon this comparison, determine the phase and amplitude corrections necessary to demodulate a concurrently transmitted signal. That is, the pilot signal can be used as a demodulation reference. In particular, the pilot signal is used as a demodulation reference for the rate indicator signal (block 420). After the rate indicator signal is demodulated and decoded into the rate indicator bits, the bits are re-encoded into symbols (block 430). Because this data is the same as the data in the received rate indicator signal, the rate indicator signal can be used as an additional demodulation reference. More particularly, in this embodiment, the combination of the pilot signal and data rate indicator signal is used as a demodulation reference for the demodulation and decoding of the data traffic signal (block 440). Because the pilot signal and rate indicator signal in combination have more power than the pilot signal alone, this combination of signals provides greater accuracy as a demodulation reference and therefore enables the demodulation and decoding of the higher-rate data traffic signal.

This approach can be implemented in various ways. Several exemplary embodiments will be described below. One of the exemplary embodiments buffers the data over the entire frame duration, while a second exemplary embodiment buffers the data and attempts early decodes of the data. A third exemplary embodiment attempts early decodes, but does not buffer the signals. A fourth exemplary embodiment demodulates and decodes the data signal using two parallel paths—one using the pilot signal as a demodulation reference, and the other using the rate indicator signal as a demodulation reference.

All of the exemplary embodiments described below employ a data channel, a pilot channel and a rate indicator channel. The pilot channel transmits a signal comprising all zeros at a fixed rate. The rate indicator channel transmits rate indicator frames at a fixed data rate which is typically very low. The data channel transmits data traffic at a variable data rate. The rate at which data is currently being transmitted is identified in a concurrently transmitted rate indicator frame on the rate indicator channel.

As noted above, a first exemplary embodiment buffers received data over the entire duration of a frame. The data and rate indicator frames are, in this embodiment, concurrent. In this embodiment, the receiver at first only demodulates the rate indicator modulation symbols. The data channel, pilot channel, and rate indicator channel are all stored in a buffer. In one particular embodiment, the received signals are stored in a high resolution buffer. The stored signals are then processed by the multi-path receiver. In an alternate embodiment, the signals for the data channel, pilot channel, and rate indicator channel are independently stored in each of the fingers of a Rake receiver.

Once an entire frame has been received, the rate indicator modulation symbols are decoded into rate indicator bits. The rate indicator bits are then re-encoded into rate indicator modulation symbols identical to those that were sent by the transmitter on the rate indicator channel. Since the receiver now knows the exact signal that was transmitted on the rate indicator channel, the rate indicator signal is therefore no different than a pilot signal, in that it is a known signal that can be compared to a received signal and used to determine the phase and amplitude corrections to be applied to another signal. The rate indicator channel can therefore be used as an additional pilot channel. The receiver can therefore use the rate indicator channel combined with the pilot channel to obtain a better quality demodulation reference, and then use this reference in the receiver to demodulate the data channel.

The process of transforming a known signal that is received into a demodulation reference is known to those in the art and consequently is described only briefly herein.

If a transmitted signal was the sequence of modulation symbols +1, −1, +1, +1, and the received signal is denoted as a1, a2, a3, a4, then the received signal may be transformed into a sequence of references as follows: a1, -a2, a3, a4. This sequence of references may then be used as demodulation reference for a data channel, or combined with other references to create even more accurate demodulation references. In this embodiment, the information on the pilot channel is known a-priori. The information on the rate indicator channel is known by demodulating the rate indicator signal into rate indicator modulation symbols using the pilot channel as demodulation reference, decoding the rate indicator modulation symbols, and re-encoding the rate indicator bits into modulation symbols. The re-encoded rate indicator modulation symbols thereby enable the use of the rate indication channel as a reference. The receiver is then re-run on the buffered data signal using both the pilot channel and the rate indicator channel as a demodulation reference to demodulate the data channel.

The pilot and rate indicator references are combined as follows:

$$g = \left(p + r \cdot \sqrt{\frac{E_r}{E_p} \cdot \frac{N_p}{N_r}}\right) \cdot K^{-1}$$

where
r is the reference derived from the rate indicator channel,
p is the reference derived from the pilot channel, $$\frac{E_r}{E_p}$$

is the ratio of energy of the reference from the rate indicator channel to the reference from the pilot channel, $$\frac{N_p}{N_r}$$

is the ratio of power of the noise on the reference from the pilot channel to the power of the noise from the rate indicator channel, and $$K = \left(\sqrt{E_p} \cdot \left(1 + \frac{E_r}{E_p} \cdot \frac{N_p}{N_r}\right)\right)$$

is an optional normalization constant.

The ratio of noises $$\frac{N_p}{N_r}$$

is known from the design of the system. For example, in a CDMA system, if the spreading factor of the rate indicator channel is 16 and the spreading factor of the pilot is 32, then the ratio $$\frac{N_p}{N_r}$$

is be 32/16=2.

The ratio of energies $$\frac{E_r}{E_p}$$

can be determined from the ratio of the rate indicator channel power to the pilot channel power. This ratio will generally change with the data rate since the rate indicator channel is used as an additional demodulation reference, and a more reliable demodulation reference is desirable when the data channel carries data at a higher rate. The power ratio is typically a function of the transmission format, and can therefore be determined from the content of the rate indicator. Alternatively, the power ratio can be estimated by the receiver. In another scenario, the ratio can be a constant for all high data rates.

The normalization constant K may be derived from an estimate of the pilot amplitude $\sqrt{E_p}$ and the values $$\frac{N_p}{N_r} \text{ and } \frac{E_r}{E_p}.$$

In some implementations, the receiver may use alternate sub-optimal weightings, or may omit the constant K.

In the embodiment where the signal is stored in a buffer before reaching the receiver, after the demodulation reference is obtained based on both the pilot signal and the rate indicator channel signal, the entire receiver is run again to demodulate the data channel. In the embodiment where signals were stored in each Rake finger, only the demodulation and combining portions of the Rake receiver have to be run again.

As noted above, the pilot and rate indicator channels can be combined and used, not only to demodulate the data traffic signal, but also to provide an improved estimate of the SNR for power control purposes. Power control between the base station and the mobile station in this type of system typically uses two loops: an inner-loop and an outer-loop. The inner-loop regularly measures the signal-to-noise ratio (SNR) at the base-station, compares it to a target SNR, and relays a power control command to the mobile station. If the measured SNR is below the target SNR the power control command will indicate that transmission power should be increased. If the measured SNR is above the target SNR the power control command will indicate that transmission power should be decreased. The outer-loop adjusts the target SNR based upon the quality of the decoding.

Figure 5:
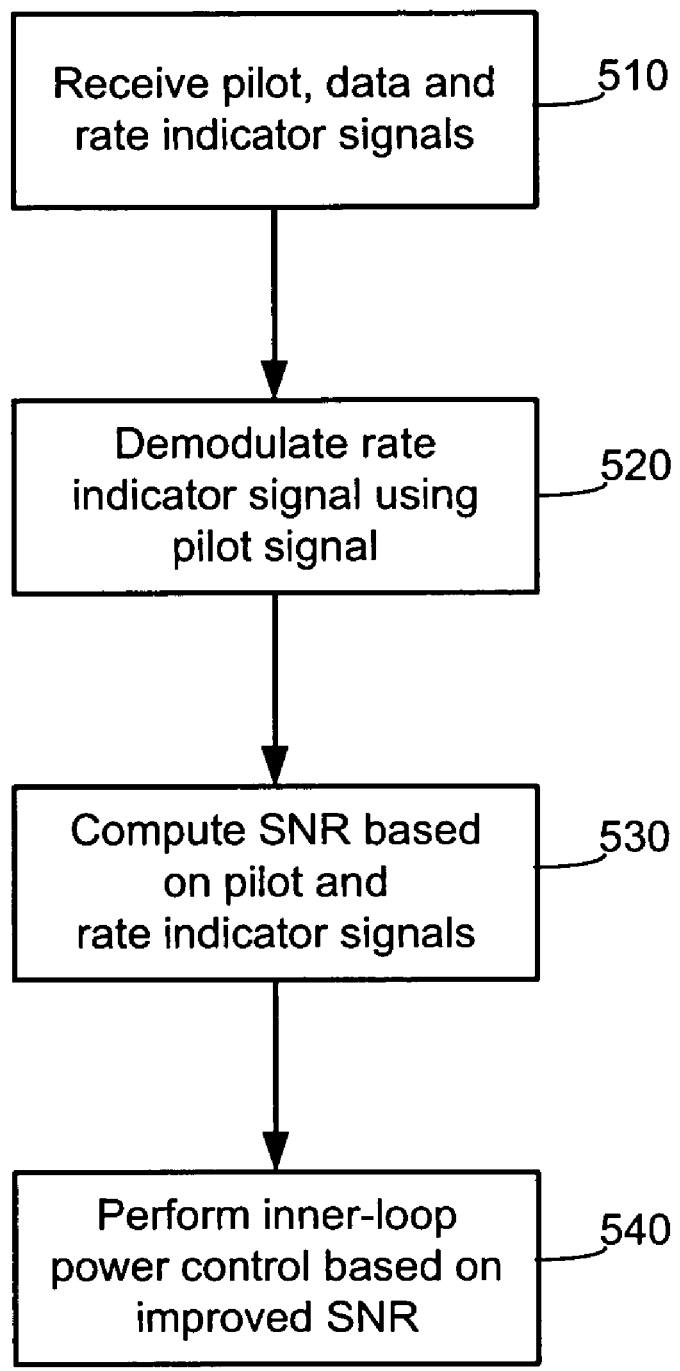
FIG. 5 is a flow diagram illustrating the use of pilot and rate indicator signals in performing power control.

Referring to FIG. 5, a flow diagram illustrating power control in the inner-loop in accordance with one embodiment is shown. In this embodiment, the receiver receives the data traffic, rate indicator and pilot signals (block 510) and demodulates the rate indicator channel using the pilot signal as a reference signal (block 520). The rate indicator signal and pilot signal can then both be used to estimate the SNR (block 530). Because this SNR is based on signals (the pilot and rate indicator signals) that have more power than the pilot alone, the SNR estimate should be more accurate than if it were computed on the basis of the pilot alone. The power control commands can then be selected based on the improved SNR estimate and transmitted in the normal course of executing the inner-loop (block 540).

A second exemplary embodiment is similar to the first exemplary embodiment described above, but attempts early decodes of the signals. One problem with the solution previously described is that it requires buffering an entire frame. If the frame is large, this can result in a considerable amount of memory usage, which is undesirable because it is very costly to provide this memory. Furthermore, waiting for the entire frame to be buffered before running the receiver on the data adds delay, which is also undesirable in certain applications.

In this embodiment, the receiver regularly attempts to decode (or demodulate) the rate indicator and verifies whether the decoding (or demodulation) was successful, even before the entire frame has been received. (Early decoding of a channel is described in U.S. Pat. No. 6,282,250, entitled "Low Delay Decoding", and will not be described in detail here.) In one embodiment, each time the receiver attempts to decode (or demodulate) the rate indicator, it measures the pilot SNR accumulated from the beginning of the frame and compares it to a threshold value. If the accumulated pilot SNR is below the threshold, the decoding (or demodulation) of the rate indicator will likely be incorrect and the receiver will therefore not even attempt to decode (or demodulate) the rate indicator. If, on the other hand, the accumulated pilot SNR is above the threshold value, the receiver decodes (or demodulates) the rate indicator and verifies whether the decoding (or demodulation) was successful. In another embodiment, the receiver attempts to decode (or demodulate) the rate indicator regularly regardless of the accumulated pilot SNR. Those skilled in the art will appreciate that determining whether or not the rate indicator was successfully decoded (or demodulated) can be done in a number of ways.

After determining that the rate indicator was successfully decoded, the receiver may then re-encode the rate indicator bits into rate indicator modulation-symbols, and proceed to demodulate the data channel for the rest of the data traffic frame, without any further buffering, using the demodulation reference derived from the rate indicator channel and the pilot channel. The receiver is then re-run with the pilot and rate indicator references to demodulate the portion of the data signal that was initially buffered before the rate indicator was successfully decoded.

Figure 6:
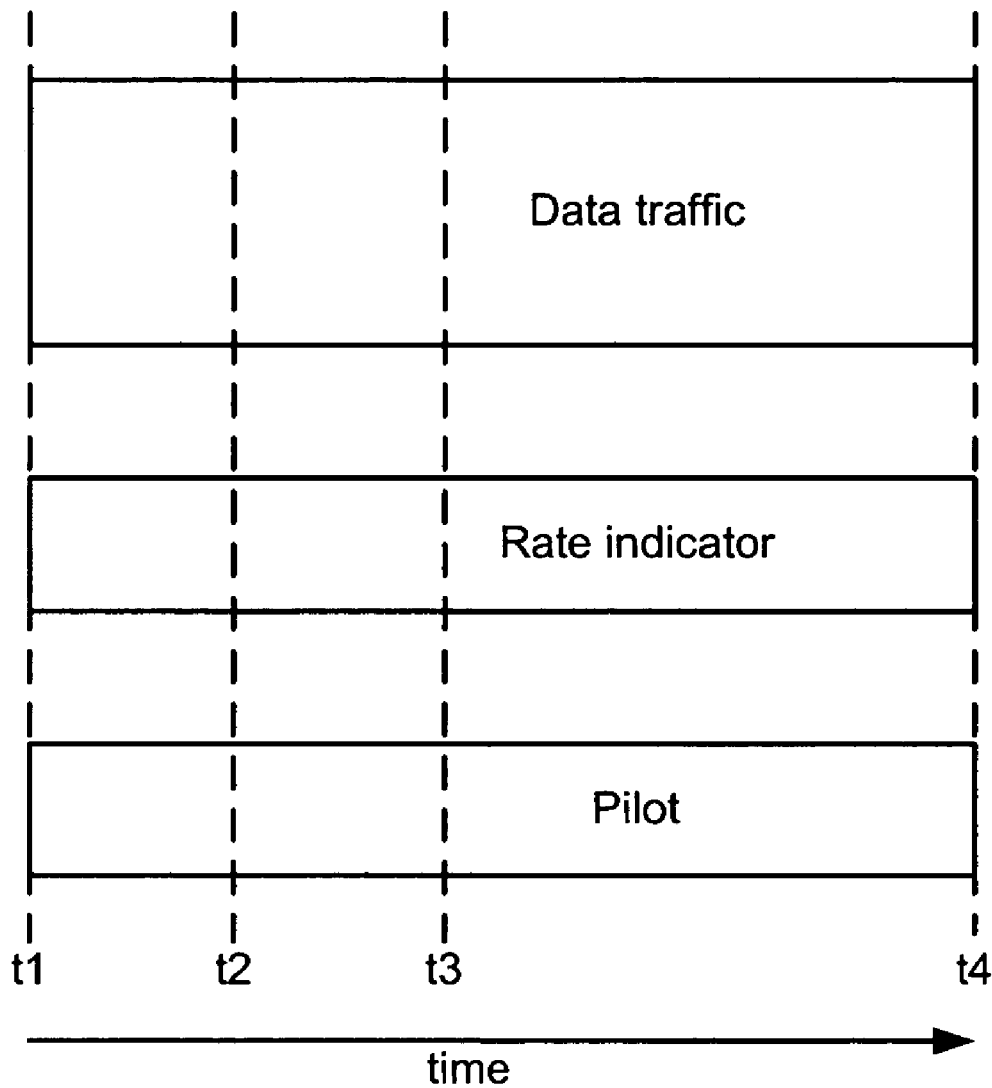
FIG. 6 is a diagram illustrating the timing of a method in accordance with an exemplary embodiment.

Referring to FIG. 6, a diagram illustrating the timing of a method in accordance with the second exemplary embodiment is shown. FIG. 6 depicts the reception of a frame where pilot, rate, and data channels are CDM. The frame lasts from time t1 to time t4. At time t1, the receiver starts buffering the received signals and demodulating the rate indicator channel using the pilot channel as demodulation reference. At time t2, the receiver attempts to decode the rate indicator, but determines that it did not succeed. At time t3, the receiver attempts again to decode the rate indicator and determines that it has succeeded. From time t3 to t4, the receiver combines the reference from the pilot channel and the reference from the rate indicator channel and uses the combined reference to demodulate the data channel from time t3 to time t4. The receiver therefore does not need to buffer the received signals from time t3 to time t4. After time t4, the receiver runs the receiver on the signals that were buffered from time t1 to time t3 and demodulates the data channel using the combined pilot and rate indicator demodulation reference.

In another alternative embodiment, a second receiver is run on the signals buffered from time t1 to time t3, while the first receiver is simultaneously demodulating the data channel between time t3 and time t4. This embodiment is therefore almost identical to the first exemplary embodiment, except that, in this embodiment, the receiver attempts to decode the rate indicator before the end of the frame at time t4. If the receiver is able to successfully decode the rate indicator before t4, then the receiver begins demodulating the data from that point forward without the need to buffer the incoming signals. The receiver then processes the buffered signals as in the first exemplary embodiment.

One advantage of this embodiment is that it is possible for the receiver to decode the data channel earlier than if the entire frame had to be buffered before being decoded. Another advantage is that the amount of data that needs to be buffered is reduced. In systems that utilize several receivers which share a common pool of memory, such as in some implementations of wireless base stations, this advantage could be particularly important. Yet another advantage is that, once the receiver determines that the rate indicator was successfully decoded, the receiver estimates the received SNR based on both the pilot signal and the rate indicator channel signal, and uses the estimated SNR for power control purposes, particularly inner-loop power control. Because the pilot signal and rate indicator signal in combination have more power than the pilot signal alone, this combination of signals provides greater accuracy to SNR estimation and improves power control performance.

A third exemplary embodiment is similar to the second exemplary embodiment, but doesn't buffer the signals. In this embodiment, the receiver does not buffer the incoming signal. The receiver starts by demodulating the rate indicator channel and the data channel using the demodulation reference derived from the pilot channel. As in the exemplary embodiment, the receiver periodically attempts to decode the rate indicator on the rate indicator channel, even before the entire frame has been received. When the receiver has determined that it has successfully decoded the rate indicator, it provides the re-encoded rate indicator modulation symbols to the receiver and instructs the receiver to derive the demodulation reference from both the combined pilot and the rate indicator channels and to use the combined demodulation reference to demodulate the remaining data signal of the frame.

This embodiment is less optimal than the first and second exemplary embodiments described above since the demodulation of the data channel only benefits from the improved demodulation reference from the time the rate indicator was successfully decoded onwards. On the other hand this embodiment has the advantage that it does not require the receiver to have any additional buffering memory. Another advantage is that, once the receiver determines that the rate indicator was successfully decoded, the receiver estimates the received SNR based on both the pilot signal and the rate indicator channel signal, and use the estimated SNR for power control purpose, in particular inner-loop power control. Because the pilot signal and rate indicator signal in combination have more power than the pilot signal alone, this combination of signals provides greater accuracy to SNR estimation and improves power control performance.

One drawback of the second and third exemplary embodiments is that the data will be irrecoverable if the rate indicator was incorrectly decoded. If the early decoding provides incorrect rate indicator bits and the receiver does not detect this error, the re-encoded rate indicator modulation symbols will be incorrect. These incorrect modulation symbols will be used by the receiver to then utilize the rate indicator channel as a demodulation reference, thereby creating an incorrect demodulation reference. This will cause the demodulation of the data channel to be erroneous. In many systems the rate indicator is encoded in such a way that it is difficult to accurately determine whether the rate indicator is correctly decoded or not. It would therefore be useful to have an embodiment that can recover from errors in early decodes of the rate indicator.

In a fourth exemplary embodiment, the receiver demodulates the data channel in two different ways and produces two outputs of the demodulated data channel. The first output is the data channel demodulated using the demodulation reference obtained from the pilot channel. The second output is the data channel demodulated using the demodulation reference obtained by combining the references from the pilot channel and the rate indicator channel, using the latest estimate of the re-encoded rate indicator modulation symbols.

During the reception of the frame, the receiver is therefore constantly given the best guess of the re-encoded rate indicator modulation symbols. The receiver regularly decodes the rate indicator bits and re-encodes these bits into rate indicator modulation symbols. The receiver need not guess whether the rate indicator decoding was successful or not. The receiver then provides the re-encoded rate indicator code-symbols to the receiver, which uses them to generate the combined demodulation reference. In addition, the receiver memorizes which rate indicator re-encoded symbols were used by the receiver at any time.

The receiver's two demodulated data channel outputs are stored and are processed when the entire frame has been received. As the frame is being received, the receiver will progressively receive more of the rate indicator, and therefore the successive decodes of the rate indicator will progressively be more likely to be correct. By the time the entire frame has been received, decoding the rate indicator provides the most reliable estimate of the rate indicator bits possible, and is assumed by the receiver to be correct.

At the time the entire frame has been received, the receiver has two buffers containing the demodulated data channel. The first buffer is the result of the demodulation of the data channel using only the pilot channel as demodulation reference. The second buffer is the result of the demodulation of the data channel using the combined demodulation estimate from the pilot channel and the rate indicator channel, based on the estimated re-encoded rate indicator modulation symbols at that time. The receiver then compares the final re-encoded rate indicator modulation symbols with the re-encoded symbols that were used at each stage in the second buffer. The portions of the second buffer that were demodulated using the correct re-encoded rate indicator modulation symbols are of better quality than those in the first buffer, since the demodulation reference was of better quality. The receiver therefore selectively combines the two buffers by taking from the second buffer the portions that were demodulated with the correct re-encoded rate indicator symbols, and taking from the first buffer the remaining of the frame. The result of this combining is a demodulated data channel of higher quality, and is therefore more likely to be correctly decoded.

This embodiment improves the quality of the demodulated data channel without requiring a large buffering of all received signals. The only increase in memory is caused by the second buffer for storing the data channel demodulated with the combined demodulation reference. Furthermore this embodiment is resistant to early rate indicator decoding errors that could cause the second exemplary embodiment and the third exemplary embodiment to fail.

If Turbo code is used for the traffic channel, the receiver requires a traffic-to-reference ratio to appropriately scale the log-likelihood metric that is used for turbo decoding. If the demodulation reference based on the pilot only is used for traffic demodulation, the scaling factor is determined by the traffic-to-pilot ratio. If the combined demodulation reference based on the pilot and the rate indicator channel signal is used for traffic demodulation, the scaling factor needs to be determined based on the traffic-to-pilot ratio, the rate indicator channel-to-pilot ratio $$(\text{e.g.}, \frac{E_r}{E_p}), \text{ and } \frac{N_p}{N_r}.$$

If high-order modulation and binary coding are used for the traffic channel, the receiver again requires traffic-to-reference ratio to demodulate high-order modulation symbols. For soft demodulation, the receiver needs the knowledge of the traffic-to-reference ratio to calculate the log-likelihood for binary encoded symbols from the corresponding high-order modulation symbols. For hard demodulation, the receiver needs the knowledge of the traffic-to-reference ratio to scale the high-order modulation symbols to obtain the hard decision of the corresponding binary symbols. If the demodulation reference based on the pilot only is used for traffic demodulation, the traffic-to-reference ratio is equal to the traffic-to-pilot ratio. If the combined demodulation reference based on the pilot and the rate indicator channel signal is used for traffic demodulation, the traffic-to-reference ratio needs to be calculated based on the traffic-to-pilot ratio, the rate indicator channel-to-pilot ratio $$(\text{e.g.}, \frac{E_r}{E_p}), \text{ and } \frac{N_p}{N_r}.$$

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method comprising:
   receiving a pilot signal, a first data signal and a second data signal;
   demodulating the first data signal using the pilot signal as a demodulation reference; and
   demodulating at least a portion of the second data signal using the first data signal as a demodulation reference,
   wherein for each frame, the first data, second data and pilot signals are buffered, wherein demodulating the first data signal is attempted before the entire frame has been buffered, and wherein demodulating the second data signal is performed after the first data signal is successfully demodulated.

2. The method of claim 1, further comprising, after the first data signal is demodulated, decoding symbols in the demodulated first data signal to produce data bits corresponding to the first data signal, re-encoding the data bits corresponding to the first data signal into symbols corresponding to the first data signal, and using the symbols corresponding to the first data signal to provide a demodulation reference based on the first data signal.

3. The method of claim 1, wherein the second data signal is a demodulated using a demodulation reference based upon the first data signal and the pilot signal in combination.

4. The method of claim 1, wherein the second data signal comprises a data traffic signal and the first data signal comprises a rate indicator signal that identifies a data rate corresponding to the data traffic signal.

5. The method of claim 1, wherein demodulating the first data signal and second data signal is performed on each frame after the entire frame has been buffered.

6. The method of claim 1, wherein a portion of the second data signal that is received after the first data signal is successfully demodulated is demodulated when received.

7. The method of claim 1, wherein a portion of the second data signal that is buffered before the first data signal is successfully demodulated is demodulated after the first data signal is successfully demodulated.

8. The method of claim 1, wherein demodulating the buffered portion of the second data signal is performed in parallel with demodulating at least the portion of the second data signal received after the first data signal is successfully demodulated.

9. The method of claim 1, further comprising estimating a received signal to noise ratio (SNR) from the first data signal and the pilot signal after the first data signal is successfully demodulated.

10. A method comprising:
    receiving a pilot signal, a first data signal and a second data signal;
    demodulating the first data signal using the pilot signal as a demodulation reference; and
    demodulating at least a portion of the second data signal using the first data signal as a demodulation reference,
    wherein demodulating the first data signal is attempted upon receiving the first data signal, wherein before the first data signal is successfully demodulated, the second data signal is demodulated using the pilot signal as a demodulation reference, and wherein after the first data signal is successfully demodulated, the second data signal is demodulated using the first data signal as a demodulation reference.

11. The method of claim 1, wherein the demodulating at least the portion of the second data signal uses the pilot signal alone or the pilot signal and the first data signal as the demodulation reference, and wherein a turbo scaling factor is adjusted for turbo decoding depending on whether the demodulation reference for the second data signal is based on the pilot signal alone or the pilot signal and the first data signal.

12. The method of claim 1, wherein the demodulating at least the portion of the second data signal uses the pilot signal alone or the pilot signal and the first data signal as the demodulation reference, and wherein a demodulation scaling factor for high-order modulation is adjusted for turbo decoding depending on whether the demodulation reference for the second data signal is based on the pilot signal alone or the pilot signal and the first data signal.

13. The method of claim 1, wherein the first data signal has a data rate which is less than a data rate of the second data signal.

14. The method of claim 1, wherein the pilot, first data and second data signals comprise CDMA signals.

15. The method of claim 1, wherein the method is implemented in a base station that is configured to receive the pilot, first data and second data signals from a mobile station.

16. A receiver for a multi-path communication link comprising:
    a receiver subsystem;
    a processing subsystem; and
    buffer,
    wherein the receiver subsystem is configured to receive a pilot signal, a first data signal and a second data signal,
    wherein the processing subsystem is configured to
        demodulate the first data signal using the pilot signal as a demodulation reference and
        demodulate at least a portion of the second data signal using the first data signal as a demodulation reference,
    wherein for each frame, the processing subsystem is configured to store the first data, second data and pilot signals in the buffer, and
    wherein the processing subsystem is configured to attempt to demodulate the first data signal before the entire frame has been buffered, and to demodulate the second data signal after the first data signal is successfully demodulated.

17. The receiver of claim 16, wherein the processing subsystem is configured to, after demodulating the first data signal, decode symbols in the demodulated first data signal to produce data bits corresponding to the first data signal, re-encode the data bits corresponding to the first data signal into symbols corresponding to the first data signal, and use the symbols corresponding to the first data signal to provide a demodulation reference based on the first data signal.

18. The receiver of claim 16, wherein the processing subsystem is configured to demodulate the second data signal using a demodulation reference based upon the first data signal and the pilot signal in combination.

19. The receiver of claim 16, wherein the second data signal comprises a data traffic signal and the first data signal comprises a rate indicator signal that identifies a data rate corresponding to the data traffic signal.

20. The receiver of claim 16, wherein for each frame, the processing subsystem is configured and to demodulate the stored first data signal and second data signal after the entire frame has been buffered.

21. The receiver of claim 16, wherein the processing subsystem is configured to demodulate a portion of the second data signal that is received after the first data signal is successfully demodulated when the portion is received.

22. The receiver of claim 16, wherein the processing subsystem is configured to demodulate a portion of the second data signal that is stored before the first data signal is successfully demodulated after the first data signal is successfully demodulated.

23. The receiver of claim 16, wherein the processing subsystem is configured to demodulate the stored portion of the second data signal and the portion of the second data signal received after the first data signal is successfully demodulated in parallel.

24. The receiver of claim 16, wherein the processing subsystem is configured to estimate a received signal to noise ratio (SNR) from the first data signal and the pilot signal after the first data signal is successfully demodulated.

25. The receiver of claim 16, wherein the processing subsystem is configured to demodulate at least the portion of the second data signal using the pilot signal alone or the pilot signal and the first data signal, and wherein the processing subsystem is configured to adjust a turbo scaling factor for turbo decoding depending on whether the demodulation reference for the second data signal is based on the pilot signal alone or the pilot signal and the first data signal.

26. The receiver of claim 16, wherein the processing subsystem is configured to demodulate at least the portion of the second data signal using the pilot signal alone or the pilot signal and the first data signal, and wherein the processing subsystem is configured to adjust a demodulation scaling factor for high-order modulation for turbo decoding depending on whether the demodulation reference for the second data signal is based on the pilot signal alone or the pilot signal and the first data signal.

27. The receiver of claim 16, wherein the first data signal has a data rate which is less than a data rate of the second data signal.

28. The receiver of claim 16, wherein the receiver comprises a CDMA receiver and wherein the pilot, first data and second data signals comprise CDMA signals.

29. The receiver of claim 16, wherein the receiver comprises a base station that is configured to receive the pilot, first data and second data signals from a mobile station.

30. A receiver for a multi-path communication link, comprising:
a receiver subsystem; and
a processing subsystem;
wherein the receiver subsystem is configured to receive a pilot signal, a first data signal and a second data signal,
wherein the processing subsystem is configured to
demodulate the first data signal using the pilot signal as a demodulation reference and
demodulate at least a portion of the second data signal using the first data signal as a demodulation reference, and wherein the processing subsystem is configured to attempt to demodulate the first data signal upon receiving the first data signal, to demodulate a portion of the second data signal received before the first data signal is successfully demodulated using the pilot signal as a demodulation reference, and to demodulate a portion of the second data signal received after the first data signal is successfully demodulated using the first data signal as a demodulation reference.

31. An apparatus for a multi-path communication link comprising:
means for receiving a pilot signal, a first data signal and a second data signal;
means for demodulating the first data signal using the pilot signal as a demodulation reference; and
means for demodulating at least a portion of the second data signal using the first data signal as a demodulation reference,
wherein for each frame, the first data, second data and pilot signals are buffered, wherein demodulating the first data signal is attempted before the entire frame has been buffered, and wherein demodulating the second data signal is performed after the first data signal is successfully demodulated.

32. An apparatus for a multi-path communication link comprising:
means for receiving a pilot signal, a first data signal and a second data signal;
means for demodulating the first data signal using the pilot signal as a demodulation reference; and
means for demodulating at least a portion of the second data signal using the first data signal as a demodulation reference,
wherein demodulating the first data signal is attempted upon receiving the first data signal, wherein before the first data signal is successfully demodulated, the second data signal is demodulated using the pilot signal as a demodulation reference, and wherein after the first data signal is successfully demodulated, the second data signal is demodulated using the first data signal as a demodulation reference.

33. A computer program product, comprising:
a computer-readable medium comprising code for causing at least one computer for:
receiving a pilot signal, a first data signal and a second data signal;
demodulating the first data signal using the pilot signal as a demodulation reference; and
demodulating at least a portion of the second data signal using the first data signal as a demodulation reference,
wherein for each frame, the first data, second data and pilot signals are buffered, wherein demodulating the first data signal is attempted before the entire frame has been buffered, and wherein demodulating the second data signal is performed after the first data signal is successfully demodulated.

34. A computer program product, comprising:
a computer-readable medium comprising code for causing at least one computer for:
receiving a pilot signal, a first data signal and a second data signal;
demodulating the first data signal using the pilot signal as a demodulation reference; and
demodulating at least a portion of the second data signal using the first data signal as a demodulation reference,
wherein demodulating the first data signal is attempted upon receiving the first data signal, wherein before the first data signal is successfully demodulated, the second data signal is demodulated using the pilot signal as a demodulation reference, and wherein after the first data signal is successfully demodulated, the second data signal is demodulated using the first data signal as a demodulation reference.

35. A method comprising:

receiving a pilot signal, a first data signal and a second data signal;

demodulating the first data signal using the pilot signal as a demodulation reference; and demodulating at least a portion of the second data signal using the first data signal as a demodulation reference, wherein demodulating at least a portion of the second data signal is performed after the first data signal is successfully demodulated.

36. An apparatus, comprising:

a receiver for receiving a pilot signal, a first data signal and a second data signal;

a processor for demodulating the first data signal using the pilot signal as a demodulation reference, and demodulating at least a portion of the second data signal using the first data signal as a demodulation reference, wherein demodulating at least a portion of the second data signal is performed after the first data signal is successfully demodulated.

37. An apparatus, comprising:

means for receiving a pilot signal, a first data signal and a second data signal;

means for demodulating the first data signal using the pilot signal as a demodulation reference; and means for demodulating at least a portion of the second data signal using the first data signal as a demodulation reference, wherein demodulating at least a portion of the second data signal is performed after the first data signal is successfully demodulated.

* * * * *